United States Patent Office 3,481,805
Patented Dec. 2, 1969

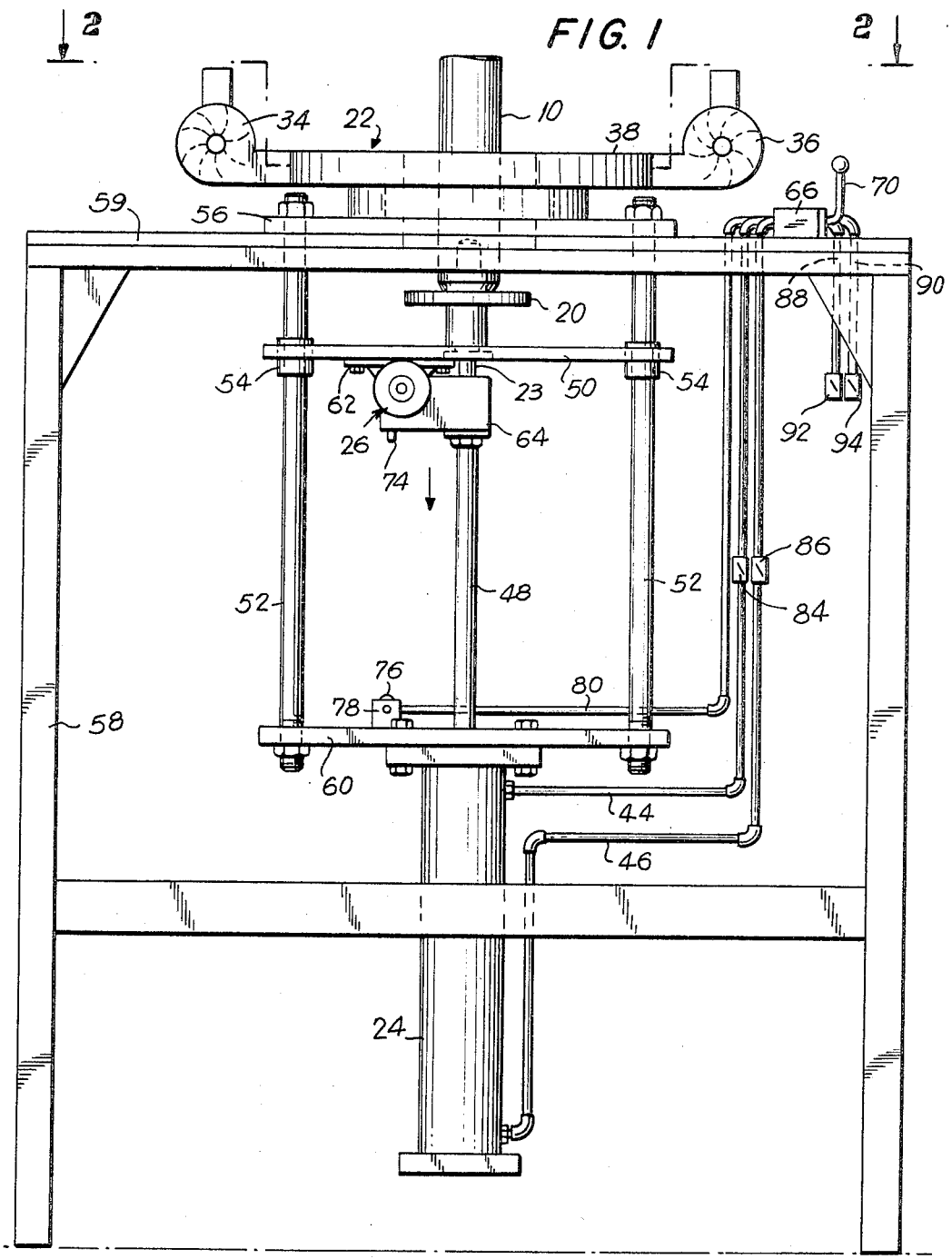

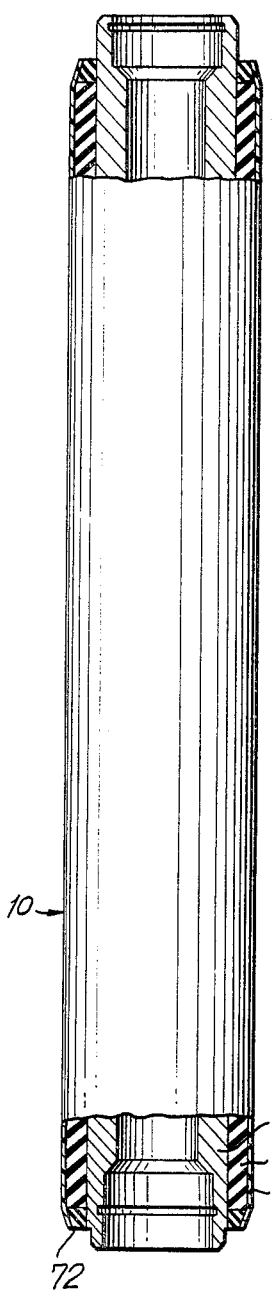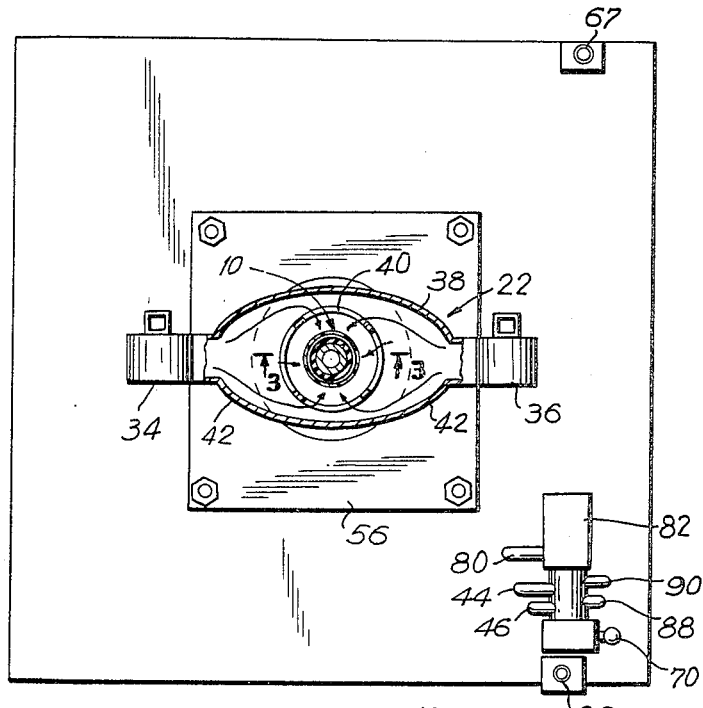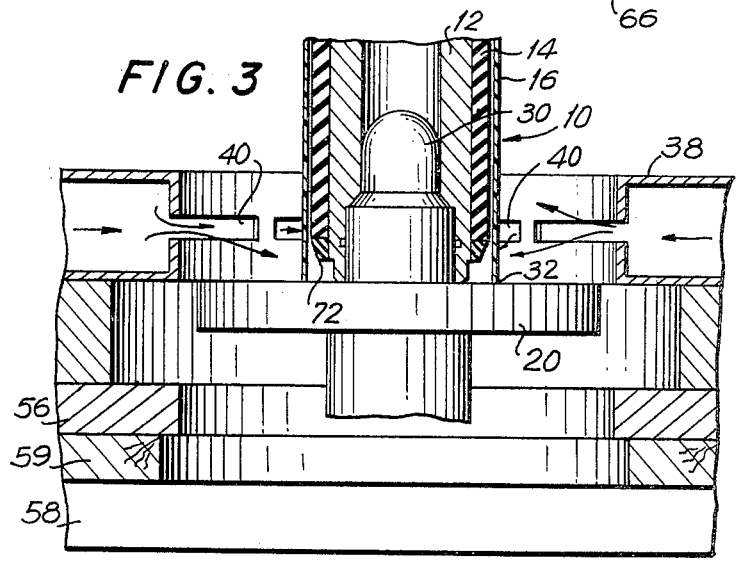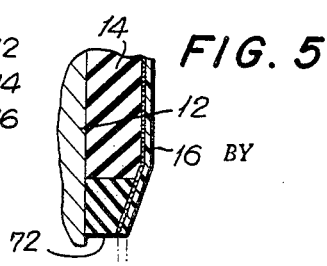

3,481,805
METHOD AND APPARATUS FOR HEAT SHRINK-ING A PLASTIC SLEEVE TO A METAL CORED RUBBER ROLL
Robert L. Holmes and Charles L. Tavelle, North Charleston, S.C., assignors to Raybestos-Manhattan, Inc., Passaic, N.J., a corporation of New Jersey
Filed Aug. 12, 1966, Ser. No. 572,020
Int. Cl. B29c 27/00, 27/10; B32b 31/12
U.S. Cl. 156—86                                  14 Claims

ABSTRACT OF THE DISCLOSURE

A method for applying a thin heat shrinkable plastic sleeve such as polytetrafluorethylene to a roll such as a silicone roll used in xerography and other applications, includes the step of heating the sleeve by blowing heated air toward the sleeve simultaneously at a large number of points to define a ring of heat, the heating being carried out while the roll is vertically supported. During the heating the relative positions of the sleeve and the ring of heat are altered by slowly moving the roll relative to the ring of heat. In this manner the heat is uniformly distributed over the sleeve as it is moved, and uniform shrinkage of the sleeve on the roll is obtained. An apparatus for carrying out the above described method is also provided.

---

This invention relates to the manufacture of rolls, especially metal cored rubber rolls, and more particularly such rolls having a plastic sleeve shrunk thereon.

The particular roll here being made is a "fuser roll" used in xerography. It runs against a heated rigid metal roll, and feeds the paper therebetween under considerable nip pressure and at a high temperature, say 360° F. at the metal roll, because it is at this point that the print is fused and embedded in the paper. It is preferred to use a silicone rubber secured to a metal core.

It has been found desirable further to encapsulate the rubber of the roll in a thin sleeve composed of a material such as polytetrafluoroethylene which is sold under the trademark "Teflon" and will hereinafter be referred to as "Teflon." This may be shrunk in place, but because of the severe working requirements, even a shrunk sleeve may creep, and it therefore is preferably additionally secured by means of a silicone resin adhesive, the inside surface of the sleeve being preliminarily etched to aid the adhesive. Heretofore the Telflon sleeve was shrunk on the roll body in a horizontal position while being turned in a lathe. The sleeve was heated by means of a hot air gun which is moved from the center toward one end, and then from the center to the other end, as the roll and sleeve rotate.

When shrinking the Teflon in a horizontal position, the weight of the Teflon produces an offset or non-centered configuration. As the Teflon shrinks, it attempts to center itself around the roll, but exact centering is not accomplished, producing an indicator reading having variations when compared to the roundness of the roll onto which it is being shrunk. A tolerance of as little as 0.01 inch may be required. Moreover, successful shrinkage without air entrapment is not always obtained when using this method of shrinkage.

In order to produce a tightly bonded sleeve, the shrinkable tubing is etched on the inside and cemented. The cement layer itself has thickness, and until it cures it is a sticky viscous fluid. The horizontal method of heat shrinking causes even greater problems of nonconcentric sleeving when using an adhesive. Rejects have been more than fifty percent.

The general object of the present invention is to overcome these difficulties. We have devised a shrinking device which shrinks the Teflon sleeve onto the roll body while in a vertical position. The sleeve can be positioned around the roll body with approximately equal spacing from the roll. There are no radial stresses caused by the weight of the Teflon to produce non-concentric sleeving. Moreover, the apparatus starts the shrinkage at the base or lower end of the sleeve, and works upward, so that air readily escapes upward, without entrapment.

Our vertical method produces a concentric covering on the roll as it shrinks simultaneously in all directions to hug the roll body. The use of the bonding cement, thought important for a good bond, does produce greater problems, but here again the vertical method is preferred and is better to help maintain the desired accuracy.

To accomplish the foregoing general objects, and other more specific objects which will hereinafter appear, our invention resides in the process and apparatus elements and their relation one to another as are hereinafter described in the following specification. The specification is accompanied by drawings in which:

FIG. 1 is a vertical elevation showing our improved apparatus;

FIG. 2 is a horizontal view taken approximately in the plane of the stepped line 2—2 of FIG. 1;

FIG. 3 is a fragmentary vertical section drawn to enlarged scale and taken approximately on the line 3—3 of FIG. 2;

FIG. 4 is a partially sectioned elevation showing the finished roll; and

FIG. 5 is a fragmentary section corresponding to the lower right corner of FIG. 4 and showing the use of adhesive between the Teflon sleeve and the rubber roll.

Referring to the drawing and more particularly to FIG. 4, the roll 10 comprises a metal core 12 carrying a silicone rubber body 14 therearound, the said body being encapsulated in a thin Teflon sleeve 16. The particular roll here shown is over two inches in diameter, and the Teflon sleeve has a thickness of 0.02 inch. The sleeve when received from the manufactured has a diameter somewhat greater than that of the roll, providing a clearance of say one-eighth inch when drawing the sleeve over the roll. The sleeve may be initially made of smaller diameter, and then be heated and expanded, and cooled in expanded condition, by the manufacturer of the sleeve, so that later in our process it will shrink by "memory" when heated. However, the method of manufacture of the shrinkable plastic sleeve forms no part of the present invention, it being important only that it be heat-shrinkable.

Referring now to FIG. 1 of the drawing, the apparatus comprises a roll support or turntable 20 which is rotatable on a vertical axis or shaft 23, and which is so shaped and dimensioned as to receive the lower end of the roll 10 and to support it in a vertical position. There is a means generally designated 22 for blowing hot air simultaneously at a large number of points around the roll, this means being located approximately at the raised position of the roll support. In FIG. 1, the support 20 has been lowered part way, and is in an intermediate rather than its fully raised position.

The apparatus further comprises a means 24 connected to the roll support 20 for slowly lowering the same for a distance approximating the length of the roll. There is also a means 26 for rotating the roll support 20 as it is lowered or raised.

Referring now to FIG. 3, the roll without the Teflon sleeve is first placed on the turntable 20, the latter preferably having a centering pin or stud 30 to receive the lower end of the roll. This is done while the support 20 is in its raised position, which initially is somewhat higher even than is shown in FIG. 3. In preferred practice the outside of the rubber body 14 of the roll was preliminarily coated with an adhesive, in this case a silicone resin adhesive. This is wet and tacky, but the roll need not be touched, except at its uncoated metal ends to place it on the turntable, and then the Teflon sleeve 16 is easily drawn downward around the roll because of the initial oversize dimension of the sleeve. Moreover, the sleeve is made longer than needed, so that its lower end may rest on the turntable 20 as shown at 32. The excess length of sleeve is trimmed off at both ends after the sleeve has been shrunk onto the roll.

Referring now to FIGS. 1 and 2, the heating means 22 comprises a pair of blower heaters or hot air guns 34 and 36 connected to a plenum ring 38 surrounding the roll at about the raised position of the turntable 20. The inside of the plenum ring may have a large number of perforations for directing the hot air radially inward entirely around the roll, and indeed in the present case it has a horizontal slit rather than perforations, as will be seen at 40 in FIGS. 2 and 3. If desired the plenum ring, although circular on the inside, may be made elliptical on the outside, it being increased in radius at the inlets as shown at 42 in FIG. 2, in order to help obtain uniform distribution of hot air around the roll.

Referring to FIG. 1, the means 24 for moving the turntable vertically is here illustrated as an air operated linear actuator which is mounted in vertical position. It is double acting, and has supply pipes 44 and 46 at its upper and lower ends, respectively. Its piston rod 48 moves a square table 50 up and down, the said table being guided on four fixed rods 52 located at the four corners of the table. The table preferably has bearings 54 which may be Teflon lined for easy sliding movement on the guide rods 52. The latter serve also as fixed space rods between a stationary top plate 56 and a stationary bottom plate 60 beneath which the air actuator 24 is mounted. The top plate 56 is carried by a frame 58 having a top 59 to which plate 56 is secured.

The means for rotating the turntable is a conventional 90° gear drive motor, which in the present case has its base 62 fixedly mounted on the bottom of the table 50. Its output shaft is indicated at 23 and carries and rotates the turntable. It is desirable to dispose the turntable shaft coaxially with the piston rod 48, without rotating the piston rod, and in the present case this is readily accomplished by fixedly connecting the upper end of piston rod 48 to the housing 64 of the gear drive motor. In other words, the piston rod 48 terminates at the housing 64, but the housing is so rigidly mounted on the table 50 that it may be used as a connecting means between the piston rod 48 and the table 50. A flexible electric cable, not shown, supplies power to the gear motor, and the current supply may be controlled by a switch located at 66. Another switch may be provided to control the operation of the two blower heaters 34 and 36 previously referred to.

The actuator 24 preferably is controlled by a four-way valve system later referred to, so that each end of the actuator cylinder has its own exhaust pipe. Descent of the turntable is started by a manual control handle 70. There is some delay, say twenty seconds delay, before the turntable moves downward, this delay being preferred in order to allow extra time for extra shrinkage of the sleeves at the tapered lower end of the roll, indicated at 72 in FIGS. 3, 4 and 5.

When the turntable has moved all the way down an adjustable stud 74 (FIG. 1) touches the control element 76 of an air valve 78 which is connected by a line 80 to a small air cylinder or actuator 82 (FIG. 2) forming a part of the valve system. This reverses the four-way valve system and starts the rise of the turntable. However, because of the lag in the operation of the several valves in series, there is another twenty seconds delay in the bottom position, which again is desired in order to provide extra time for shrinkage of the sleeve on the taper at the upper end of the cylinder.

The main shrinkage of the sleeve is preferably accomplished as the roll descends, thus affording free escape of air at the open upper end of the sleeve. The descent of the turntable is therefore preferably a slow descent, whereas the subsequent rise may be more rapid. For accurate control of the speed of the actuator, the supply pipes 44 and 46 are preferably provided with microcontrol valves schematically represented at 84 and 86 (FIG. 1). These may be small fixedly adjustable needle valves which provide a constriction for limited air flow. It is evident that the downward speed may be controlled independently of the upward speed.

Moreover, for additional close control of the travel speed, the separate exhaust lines 88 and 90 from the four-way valve system (and therefore from the two ends of the actuator) are also provided with microcontrol valves, indicated at 92 and 94. Constriction here provides a back pressure which opposes the movement of the actuator piston, and so affords more precise control of the travel speed. It is because of valves 92 and 94 that a valve system is used which has two exhaust lines instead of one.

In the present case the descent of the turntable is adjusted to take, say fifty seconds, whereas the ascent may be speeded to take, say twenty seconds. The entire operation including the dwell period at each end takes say two minutes.

The particular valve mechanism here shown in FIG. 2 is a Versa one-quarter inch Four-Way Valve No. VPH4302. It has two separate exhaust ports. The motion limiting valve 78 which provides the automatic reversal of the actuator is also a Versa valve.

The heater is designed to produce hot air a a temperature of from 400° to 600° F., equally distributed through the plenum, so that all sides of the shrinkable tubing are being equally heated. This is further assured by rotation of the turntable. These features help produce concentricity of the sleeve with respect to the roll surface. This desired concentricity is difficult to obtain when the roll body being encapsulated is made of a soft, easily deformable elastomer, or even a rigid metal on which a fluid adhesive is being used.

This machine has made it possible to produce rolls of more than two inches diameter having a soft elastomeric wall encapsulated in a heat shrinkable plastic, which rolls meet tolerances as close as ten thousandths of an inch in roundness, in production quantities, and with less than one percent rejects, whereas the horizontal lathe method formerly used produced over fifty percent rejects.

It is believed that the construction and operation of our improved apparatus for applying a heat shrinkable plastic sleeve to a roll, as well as the advantages thereof, will be apparent from the foregoing description. It will also be apparent that while we have shown and described the invention in a prefered form, changes may be made without departing from the scope of the invention.

We claim:

1. Apparatus for applying a heat shrinkable sleeve to a roll, said apparatus comprising a roll support which is rotatable on a vertical axis and which is so shaped and dimensioned as to receive the lower end of the roll and to support the roll and sleeve in vertical position, means to heat the sleeve by blowing heated air toward the sleeve simultaneously at a large number of points around the sleeve, said means being located approximately at the raised position of the roll support, means for slowly lowering the roll support for a distance approximating the length of the roll, and means for rotating the roll support as it is lowered.

2. Apparatus as defined in claim 1, in which the means to lower the roll support is a vertically disposed linear actuator, and in which a motor for rotating the roll support is raised and lowered with the roll support by the actuator.

3. Apparatus as defined in claim 2, in which the linear actuator for lowering and raising the roll is operated by a fluid, and in which the pipes supplying the fluid to the actuator have microcontrol valves for adjusting the rate of movement of the actuator, the down rate being independent of the up rate.

4. Apparatus as defined in claim 3 in which there is a valve system controlling the actuator, and exhaust pipes from the valve system, and in which the exhaust pipes have microcontrol valves to help adjust the rate of movement of the actuator, the down rate being independent of the up rate.

5. Apparatus as defined in claim 4, in which there is a manually operated valve to start lowering of the roll support, and in which there is a motion limiting return valve which is operated automatically when the roll support has been lowered for a desired distance, to initiate upward return movement of the roll support.

6. Apparatus as defined in claim 5, in which the means to heat the sleeve comprises one or more blower heaters connected to a plenum ring surrounding the roll, the inside of said plenum ring having openings for discharge of hot air toward the sleeve and roll.

7. Apparatus as defined in claim 1, in which the means to heat the sleeve comprises one or more blower heaters connected to a plenum ring surrounding the roll, the inside of said plenum ring having openings for discharge of hot air toward the sleeve and roll.

8. The method of applying a thin heat-shrinkable plastic sleeve to a roll, which includes mounting the roll on a support with the roll in vertical position with the sleeve on the roll, heating the sleeve by blowing heated fluid toward the sleeve simultaneously at a large number of points around the sleeve to define a ring of heat substantially uniformly distributed about the circumference of the roll and located adjacent one end of said roll, slowly altering the relative vertical positions of the roll and sleeve on said support relative to the ring of heat to shift the ring of heat from said one end toward the other end of the roll, and then restoring the support to its relative starting position.

9. A method as defined in claim 8, in which the roll has a short taper at each end, and is held with its end at the heating zone for an additional period of time in order to effect additional shrinkage at the taper.

10. A method as defined in claim 9, in which the roll is preliminarily coated with an adhesive, in order to additionally secure the sleeve to the roll, and is supported in vertical position before drawing the sleeve downward around the roll.

11. A method as defined in claim 10, in which the roll is a metal cored rubber roll, the rubber of which is a silicone rubber, and in which the adhesive is a silicone resin adhesive, and in which the sleeve is composed of polytetrafluoroethylene.

12. A method as defined in claim 8, in which the roll is preliminarily coated with an adhesive, in order to additionally secure the sleeve to the roll, and is supported in vertical position before drawing the sleeve downward around the roll.

13. The method as defined in claim 8, in which the altering of the relative vertical positions of the roll and sleeve relative to the ring of heat is effected by slowly lowering the roll and sleeve such that the ring of heat is shifted from the lower end of said roll to the upper end of said roll.

14. The method as defined in claim 8, in which the step of rotating the roll and sleeve while heating the sleeve is added.

References Cited

UNITED STATES PATENTS

| 3,318,233 | 5/1967  | Curtis        | 29—132 XR |
| 3,324,625 | 6/1967  | Dulmage       | 156—497 XR |
| 3,225,129 | 12/1965 | Taylor et al. | 156—86 XR |
| 3,115,536 | 12/1963 | Janis et al.  | |

FOREIGN PATENTS 986,734   3/1965   Great Britain.

PHILIP DIER, Primary Examiner

U.S. Cl. X.R.

18—1; 29—132; 156—294, 497; 264—342